(12) United States Patent
Engel et al.

(10) Patent No.: US 9,588,307 B2
(45) Date of Patent: Mar. 7, 2017

(54) PARALLEL OPTICAL TRANSCEIVER WITH TOP AND BOTTOM LENSES

(71) Applicant: Avago Technologies General IP (Singapore) Pte. Ltd., Singapore (SG)

(72) Inventors: Andrew G. Engel, Portola Valley, CA (US); David J. K. Meadowcroft, San Jose, CA (US); Michael J. Brosnan, Fremont, CA (US); Omid Momtahan, Palo Alto, CA (US); Klaus D. Giessler, Menlo Park, CA (US); Li Ding, Pleasanton, CA (US); Paul Yu, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 97 days.

(21) Appl. No.: 14/311,259

(22) Filed: Jun. 21, 2014

(65) Prior Publication Data

US 2015/0370020 A1   Dec. 24, 2015

(51) Int. Cl.
*G02B 6/42* (2006.01)

(52) U.S. Cl.
CPC ......... *G02B 6/4214* (2013.01); *G02B 6/4277* (2013.01); *G02B 6/4278* (2013.01); *G02B 6/4231* (2013.01)

(58) Field of Classification Search
CPC .. G02B 6/4204; G02B 6/4212; G02B 6/4292; G02B 6/43; G02B 6/4257; G02B 6/4259; G02B 6/426; G02B 6/428; G02B 7/021
See application file for complete search history.

(56) References Cited

U.S. PATENT DOCUMENTS

| | | | | |
|---|---|---|---|---|
| 6,304,436 B1* | 10/2001 | Branch | ............... | G02B 6/4277 |
| | | | | 361/679.02 |
| 7,329,054 B1* | 2/2008 | Epitaux | ............... | G02B 6/4249 |
| | | | | 385/89 |
| 8,292,518 B2 | 10/2012 | Togami et al. | | |
| 8,608,389 B2 | 12/2013 | Tamura et al. | | |
| 2003/0053766 A1* | 3/2003 | Cheng | ................. | G02B 6/4292 |
| | | | | 385/89 |
| 2005/0185896 A1* | 8/2005 | Kao | ..................... | G02B 6/4249 |
| | | | | 385/89 |
| 2006/0056765 A1* | 3/2006 | Hwang | ................... | G02B 6/43 |
| | | | | 385/39 |

(Continued)

OTHER PUBLICATIONS

R. Krishnamurthy. The Luxtera CMOS Integrated Photonic Chip in a Molex Cable. Chipworks Blog [online]. Chipworks Inc., Dec. 3, 2012 [retrieved on May 11, 2014]. Retrieved from the Internet: <http://www.chipworks.com/en/technical-competitive-analysis/resources/blog/the-luxtera-cmos-integrated-photonic-chip-in-a-molex-cable/>.

(Continued)

*Primary Examiner* — Thomas A Hollweg
*Assistant Examiner* — Mary A El Shammaa

(57) ABSTRACT

A parallel optical communications module includes a top lens and a bottom lens that are spaced from one another to inhibit mechanical forces acting upon the top lens from being transferred to the bottom lens, which is optically aligned with an opto-electronic light source or light detector. The top lens has a reflector portion configured to redirect the optical signals between the bottom lens and one or more optical fibers.

19 Claims, 7 Drawing Sheets

(56) References Cited

U.S. PATENT DOCUMENTS

2011/0228483 A1* 9/2011 Togami ................ G02B 6/4246
361/714

OTHER PUBLICATIONS

R. Hult. Fiber in the Box! Connector and Cable Assembly Supplier, Mar. 4, 2013 [retrieved on May 11, 2014]. Retrieved from the Internet: <http://www.connectorsupplier.com/030513-cs-fiber-in-the-box-hult/>.

* cited by examiner

PARALLEL OPTICAL TRANSCEIVER WITH TOP AND BOTTOM LENSES

BACKGROUND

Optical data transceiver modules convert optical signals received via an optical fiber into electrical signals, and convert electrical signals into optical signals for transmission via an optical fiber. In the transmitter portion of a transceiver module, an opto-electronic light source such as a laser performs the electrical-to-optical signal conversion. In the receiver portion of the transceiver module, an opto-electronic light detector such as a photodiode performs the optical-to-electrical signal conversion. A transceiver module commonly also includes optical elements, such as lenses, as well as electrical circuitry such as drivers and receivers. A transceiver module also includes one or more fiber ports to which an optical fiber cable is connected. The light source, light detector, optical elements and electrical circuitry are mounted within a module housing. The one or more fiber ports are located on the module housing.

Various transceiver module configurations are known. One type of transceiver module configuration is known as Small Form Factor Pluggable (SFP). Such SFP transceiver modules include an elongated housing having a substantially rectangular cross-sectional shape. A forward end of the housing is connectable to an optical fiber cable. A rearward end of the housing has an array of electrical contacts that can be plugged into a mating connector when the rearward end is inserted or plugged into a slot of a network switch or other device. An SFP transceiver module having four parallel transmit channels and four parallel receive channels is commonly referred to as Quad SFP or QSFP.

In an SFP transceiver module, the light source and light detector can be mounted on a printed circuit board (PCB) with their optical axes normal to the plane of the PCB. As these device optical axes are perpendicular to the ends of the optical fibers at the forward end of the module housing, there is a need to redirect or "turn" the signals 90 degrees between the fibers and the device optical axes. In an SFP transceiver having only a single channel, the optical elements commonly include one or more reflective surfaces that turn the signals in the optical domain. However, in a QSFP or other parallel optical transceiver module, a 90-degree flex circuit is commonly employed to turn the signals in the electrical domain because turning the signals in the optical domain can present obstacles to achieving good optical alignment.

Achieving and maintaining good optical alignment among multiple parallel opto-electronic devices, lenses, reflective surfaces, and optical fibers can present problems. It would be desirable to provide a parallel optical data transceiver module that promotes good optical alignment among such elements.

SUMMARY

Embodiments of the present invention relate to a parallel optical communications module that includes a top lens device and a bottom lens device. In an exemplary embodiment, the optical communications module includes a module housing and an electro-optical sub-assembly having a printed circuit board. An opto-electronic device, such as a light source or a light detector, is mounted on a surface of the electro-optical sub-assembly, and the bottom lens device is mounted over the opto-electronic device. The top lens device is spaced apart from the bottom lens device by a gap. The top lens device has a plurality of fiber ports configured to communicate optical signals with a fiber-optic cable at the forward end of the module housing. The top lens device also has a plurality of device ports configured to communicate the optical signals with the opto-electronic device through the bottom lens. The top lens device has a reflector portion configured to redirect the optical signals at a non-zero angle between the fiber ports and the device ports.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
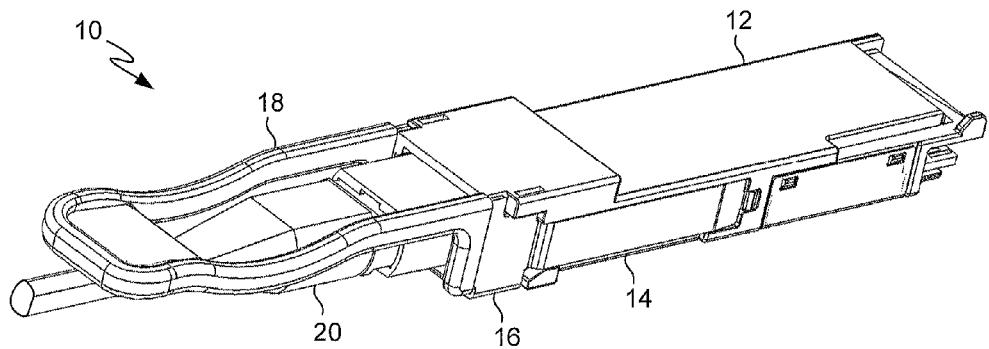
FIG. 1 is a perspective view of a parallel optical transceiver module in accordance with an exemplary embodiment of the invention.
Figure 2:
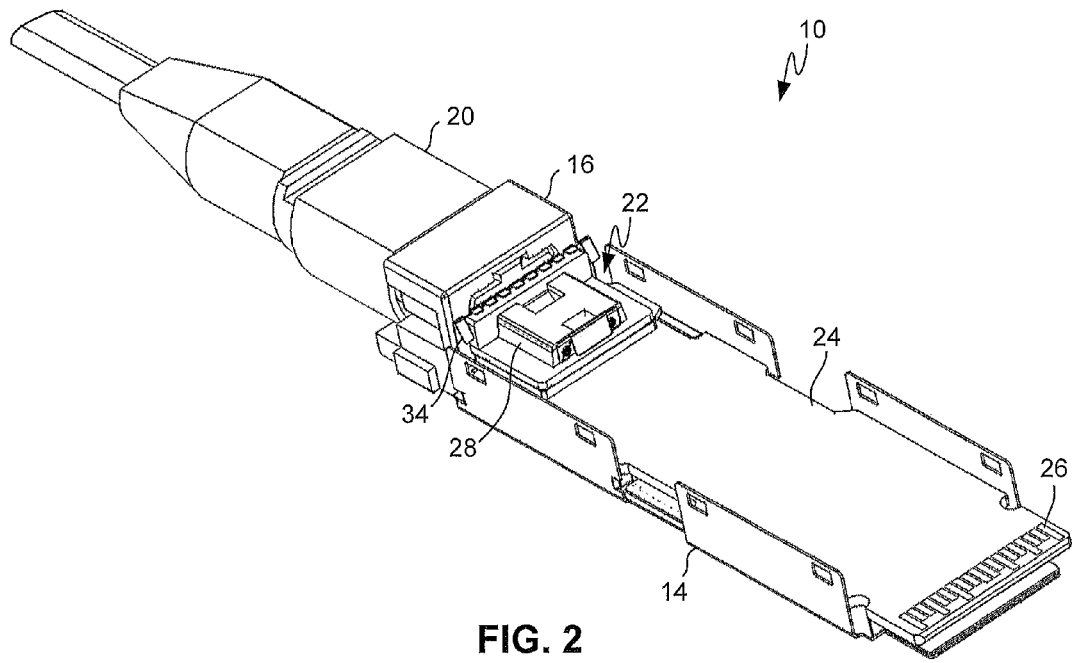
FIG. 2 is a perspective view of the transceiver module of FIG. 1, with the upper housing removed to reveal the module interior.

As illustrated in FIGS. 1-2, in a first illustrative or exemplary embodiment of the invention, an optical communications module 10 includes an upper module housing 12, a lower module housing 14, a housing nose 16, and a delatch assembly 18, arranged in a generally SFP module configuration. Upper module housing 12, which can be made of cast metal, lower module housing 14, which can be made of sheet metal, and housing nose 16 together define a module housing. Housing nose 16 defines a forward end of optical communications module 10 and in the exemplary embodiment is configured to mate with a conventional multiple-fiber push-on (MPO) connector 20. As the structure and operation of MPO connector 20 are well understood in the art, such aspects are not described in detail herein. It is sufficient to note that an end face (not shown) of MPO connector 20 retains the ends of a plurality of optical fibers in an array. Although in the exemplary embodiment housing nose 16 is configured to mate with MPO connector 20, in other embodiments (not shown), a housing nose can be configured to mate with other types of connectors or to provide an active optical cable (AOC) connection.

As illustrated in FIG. 2, an electro-optical sub-assembly 22 includes an elongated printed circuit board (PCB) 24 retained in lower module housing 14. A plurality of electrical contact pads 26 are arrayed on the surface of PCB 24 at a rearward end of optical communications module 10. Although not shown for purposes of clarity, integrated circuit packages and other electronic devices can be mounted on the surface of PCB 24. Although also not shown for purposes of clarity, PCB 24 includes circuit traces for interconnecting such electronic devices with electrical contact pads 26 and other opto-electronic and electronic elements described below.

Figure 3:
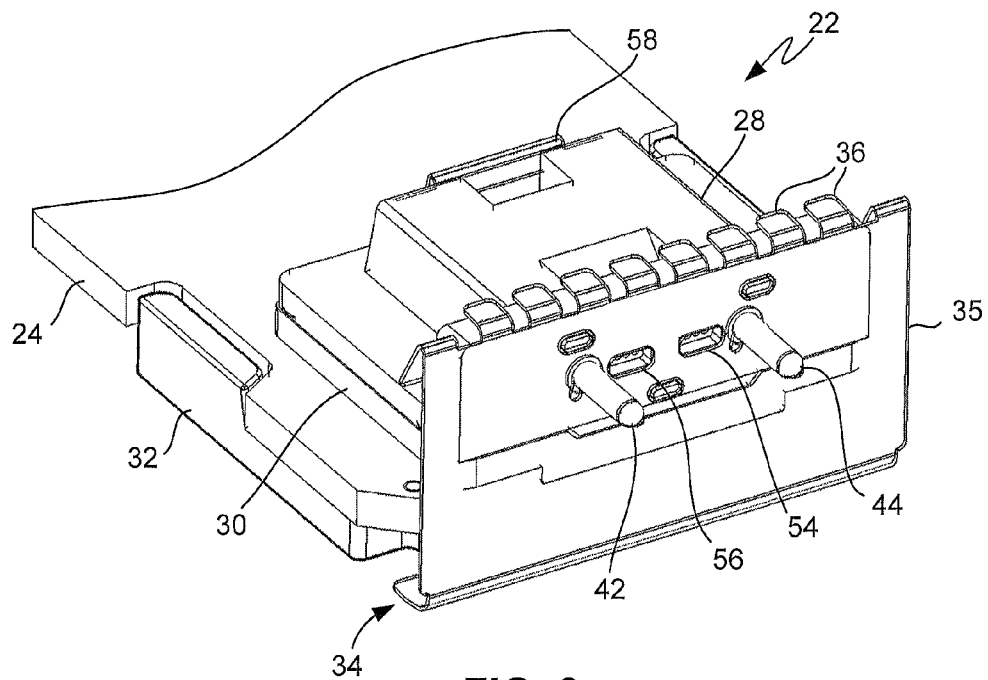
FIG. 3 is a front perspective view of the forward end of the transceiver module, with portions of the fiber connector removed for clarity.
Figure 4:
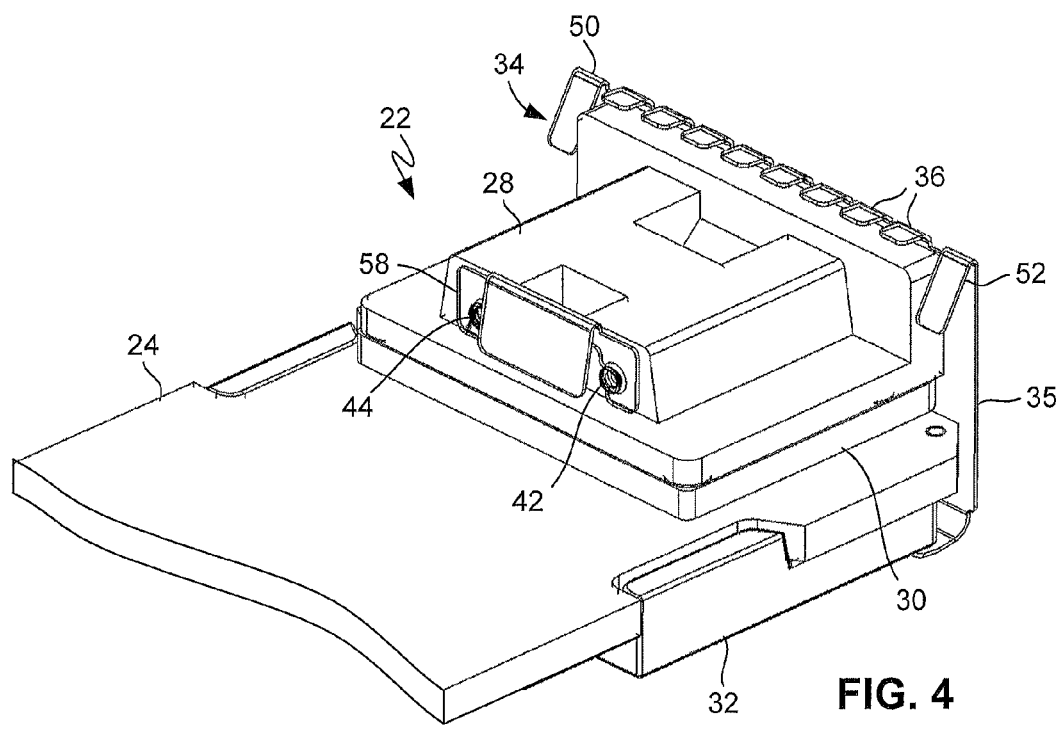
FIG. 4 is similar to FIG. 3 but a rear perspective view.

As illustrated in further detail in FIGS. 3-4, electro-optical sub-assembly 22 further includes a top lens device 28, a lens mounting frame 30, and a device mounting block 32. Lens mounting frame 30 is substantially planar and rectangular, with a continuous perimeter surrounding an open interior region (in the manner of, for example, a picture frame). Lens mounting frame 30 is mounted on PCB 24, with a lower surface of lens mounting frame 30 contacting the surface of PCB 24. Lens mounting frame 30 can be mounted on PCB 24 with a suitable adhesive, such as epoxy (not shown).

Top lens device 28 is mounted on lens mounting frame 30, with a lower surface of top lens device 28 contacting an upper surface of lens mounting frame 30. Top lens device 28 can be made of a molded plastic material that is optically transparent to the wavelengths of the signals transmitted and received by optical communications module 10. An example of a suitable material is ULTEM amorphous thermoplastic polyetherimide, available from SABIC Innovative Plastics of Saudi Arabia. Lens mounting frame 30 can be made of essentially the same material as top lens device 28 to provide matching thermal expansion characteristics. However, lens mounting frame 30 can be optically opaque to facilitate laser welding by directing a laser beam (not shown) through top lens device 28 and into lens mounting frame 30. Due to its opacity, lens mounting frame 30 absorbs the laser energy and transforms it into heat, which fuses the lower surface of top lens device 28 to the upper surface of lens mounting frame 30 to form a weld.

An electromagnetic interference (EMI) shield 34 has a planar face 35 that abuts the forward end of top lens device 28. EMI shield 34 can be made of sheet metal. Referring briefly again to FIG. 2, note that EMI shield 34 is interposed between the forward end of top lens device 28 and housing nose 16. As further illustrated in FIGS. 5-6, EMI shield 34 has EMI gasketing 36 in the form of a pattern of resilient fingers that bear against portions of the metallic module housing. In this manner, EMI shield 34 inhibits EMI from entering or exiting the interior of optical communications module 10 where such EMI could adversely affect the operation of the opto-electronic and electronic elements described below or fail radiated emission requirements.

Figure 5:
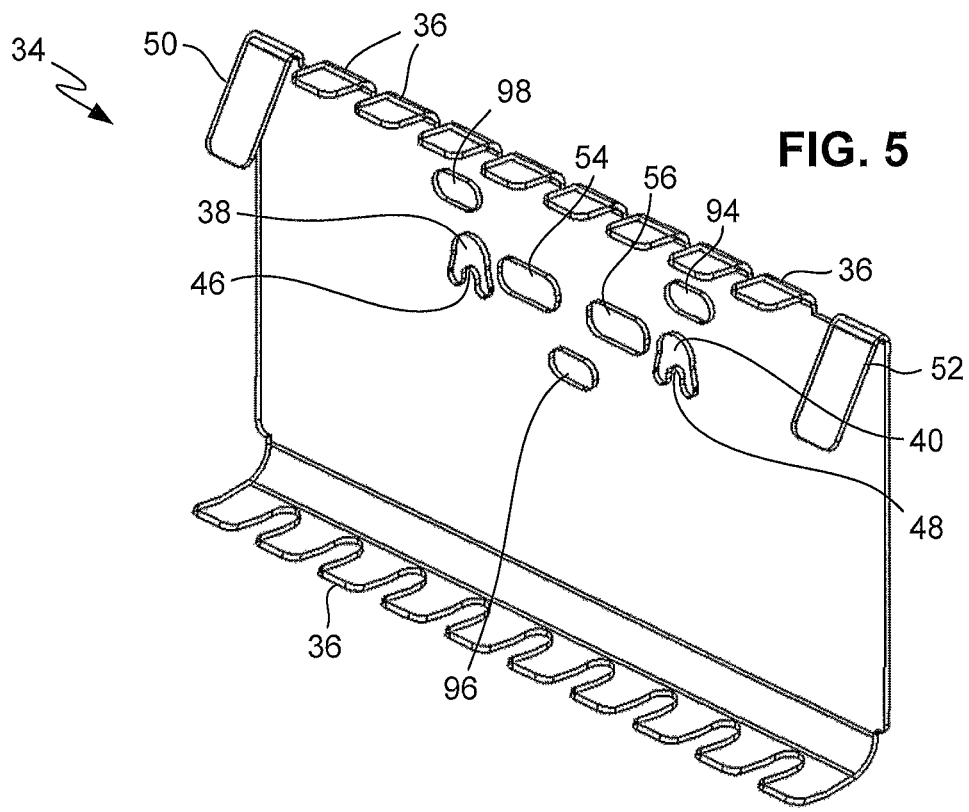
FIG. 5 is a perspective view of the electromagnetic interference (EMI) shield of the transceiver module.
Figure 6:
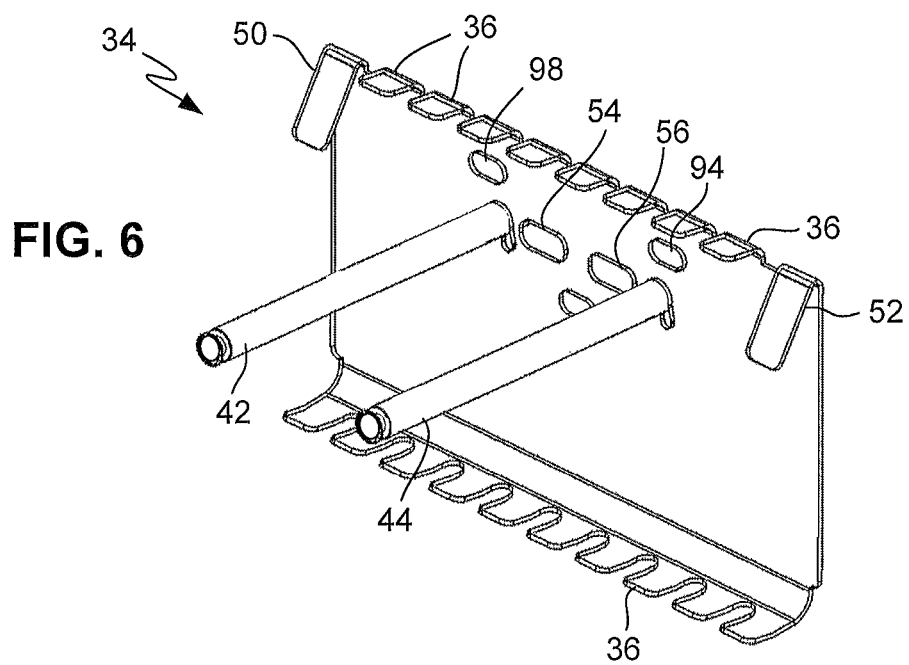
FIG. 6 is similar to FIG. 5 but showing guide pins inserted.

EMI shield 34 has two guide pin openings 38 and 40 (FIG. 5). A pair of guide pins 42 and 44 extend through (FIGS. 3-4) guide pin openings 38 and 40, respectively, which have dimensions substantially corresponding to the diameters of guide pins 42 and 44. Referring again to FIGS. 5-6, the walls of guide pin openings 38 and 40 have deformable protrusions 46 and 48, respectively, which extend into openings 38 and 40 and thereby partly obstruct or restrict the dimensions of openings 38 and 40. As guide pins 42 and 44 are inserted into guide pin openings 38 and 40 during assembly, the ends of guide pins 42 and 44 contact deformable protrusions 46 and 48 and deform or bend them, thereby promoting good electrical contact between EMI shield 34 and guide pins 42 and 44.

EMI shield 34 has two resilient protrusions 50 and 52. Each of protrusions 50 and 52 has a bent or J-shape that can be resiliently compressed to exert a spring bias force. In the fully assembled optical communications module 10, protrusions 50 and 52 bear against a wall (not shown) inside the forward end of upper module housing 12 and housing nose 16 and are slightly compressed. In response to being compressed in this manner, protrusions 50 and 52 exert a spring bias force that urges EMI shield 34 toward and into contact with housing nose 16. As EMI shield 34 is maintained in contact with housing nose 16 in this manner, there is essentially no gap or slack between them, thereby inhibiting EMI penetration into or emanation from the interior of optical communications module 10. In addition to the above-described features, EMI shield 34 has two optical openings 54 and 56 through which optical signals pass in the manner described below.

Referring again to FIGS. 3-4, a retaining plate 58 abuts the rearward end of top lens device 28 and has slots that engage grooves in the rearward ends of guide pins 42 and 44. Guide pins 42 and 44 extend from retaining plate 58 through top lens device 28 and from top lens device 28 through EMI shield 34. Top lens device 28 is thus sandwiched between retaining plate 58 and EMI shield 34.

Figure 7:
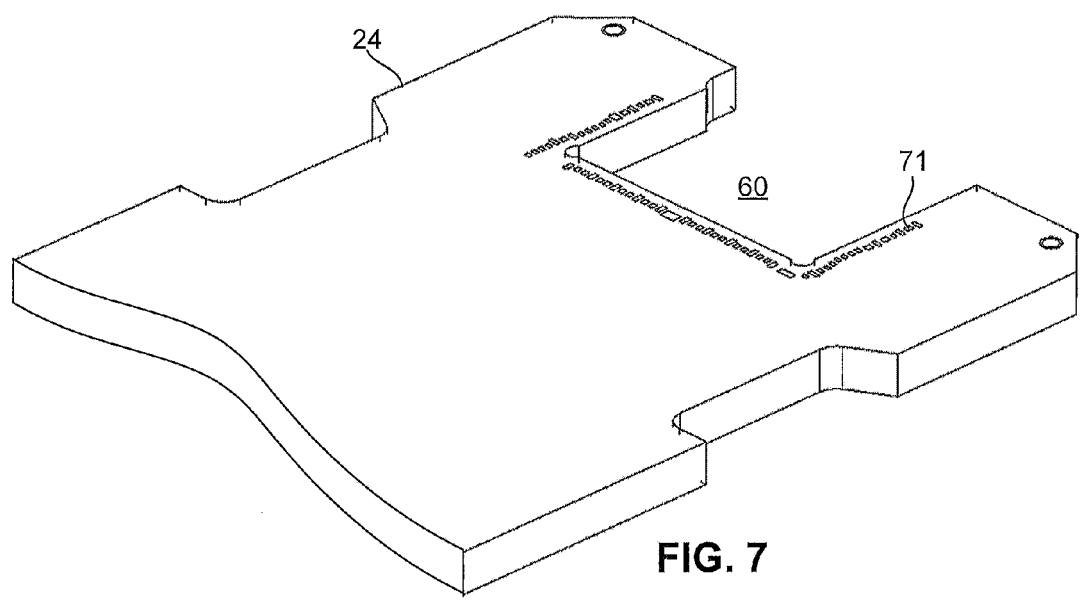
FIG. 7 is a perspective view of the forward end of the PCB of the transceiver module.
Figure 8:
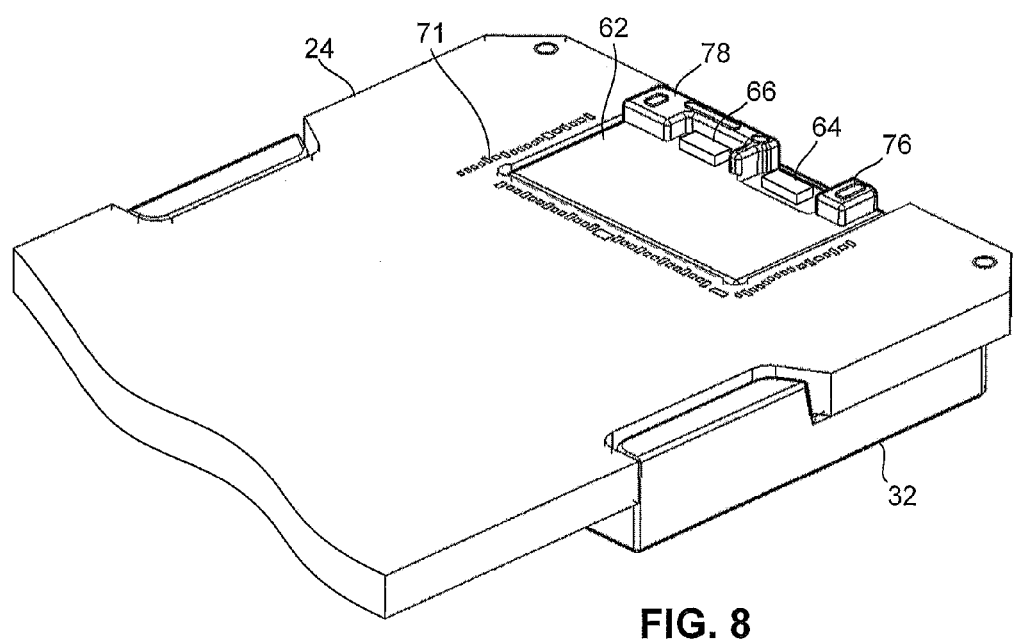
FIG. 8 is a perspective view of the forward end of the PCB of the transceiver module with a device mounting block attached.

As illustrated in FIGS. 7-8, a portion of device mounting block 32 extends from beneath PCB 24 into a notch 60 in the forward end of PCB 24, with a surface 62 of device mounting block 32 occupying notch 60 and parallel to the surface of PCB 24. An opto-electronic light source 64 is mounted on surface 62 of device mounting block 32. Opto-electronic light source 64 can be, for example, a vertical cavity surface-emitting laser (VCSEL) chip with an array of (e.g., four) laser elements (not individually shown for purposes of clarity). In operation, the laser elements emit light beams, i.e., optical transmit signals, along respective optical axes normal to surface 62. An opto-electronic light detector 66 is also mounted on surface 62 of device mounting block 32. Opto-electronic light detector 66 can be, for example, a PIN photodiode chip with an array of (e.g., four) photodiode elements (not individually shown for purposes of clarity). In operation, the photodiode elements detect light beams, i.e., optical receive signals, along respective optical axes normal to surface 62. Opto-electronic light source 64 and opto-electronic light detector 66 can be die-attached to surface 62 to promote heat transfer into device mounting block 32. Device mounting block 32 can consist of cast metal, such as copper, which acts as a heat sink to aid conveying excess heat to the module housing.

Figure 9:
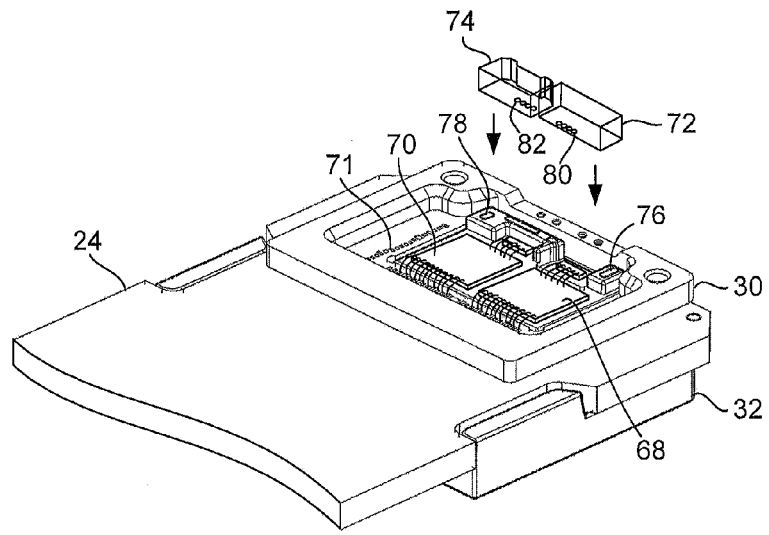
FIG. 9 is a perspective view of the forward end of the PCB of the transceiver module with the device mounting block, a lens mounting frame, and opto-electronic and electronic devices attached, and showing the mounting of lenses on the device mounting block.
Figure 10:
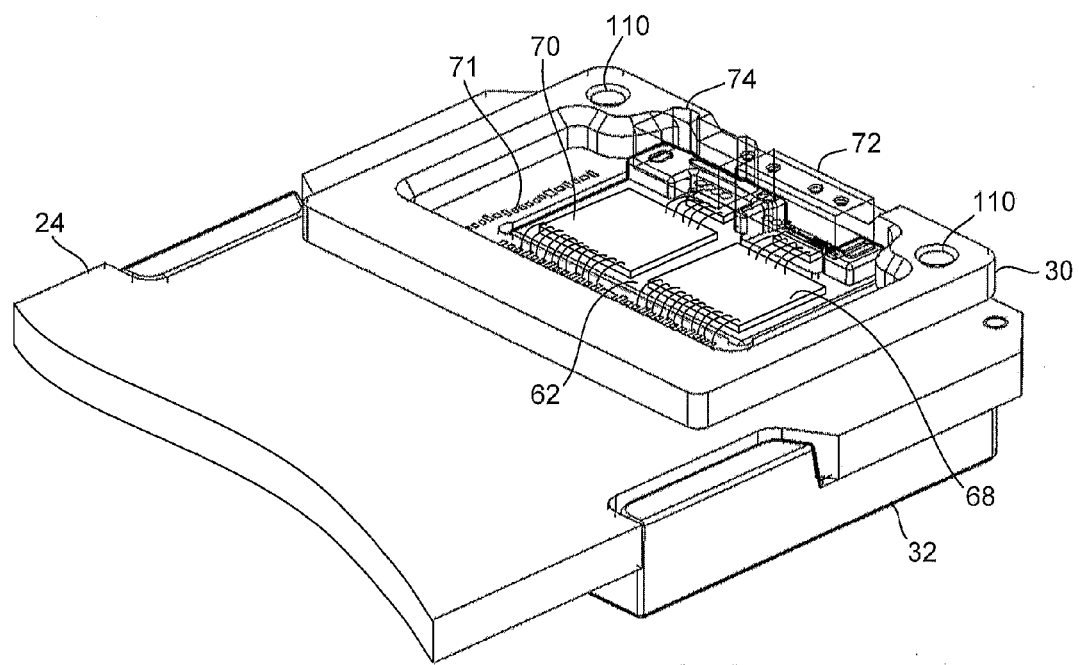
FIG. 10 is similar to FIG. 9, with the lenses mounted.

As illustrated in FIGS. 9-10, additional electronic elements, such as a driver chip 68 and a receiver chip 70, can also be die-attached to surface 62 of device mounting block 32. Opto-electronic light source 64 and opto-electronic light detector 66, as well as driver chip 68 and receiver chip 70, can be electrically interconnected to each other and to printed circuit pads 71 (FIG. 8) on PCB 24 by wirebonding. Printed circuit pads 71 are coupled to circuit traces (not shown for purposes of clarity) in PCB 24, and such circuit traces are, in turn, coupled to electrical contact pads 26 (FIG. 2).

With further reference to FIGS. 9-10, lens mounting frame 30 is mounted on the upper surface of PCB 24 in an orientation in which the perimeter of lens mounting frame 30 surrounds surface 62 of device mounting block 32.

In assembling optical communications module 10, a transmit bottom lens device 72 and a receive bottom lens device 74 are mounted over opto-electronic light source 64 and opto-electronic light detector 66, respectively, as indicated by the arrows in FIG. 9. More specifically, transmit bottom lens device 72 and receive bottom lens device 74 are mounted on standoff portions 76 and 78 extending from surface 62 of device mounting block 32. Transmit bottom lens device 72 and receive bottom lens device 74 can, for example, consist of generally brick-shaped blocks of optically transparent material, such as ULTEM. Transmit bottom lens device 72 and receive bottom lens device 74 have arrays of lenslets 80 and 82 (FIG. 9), respectively, formed in their surfaces and aligned with the corresponding optical axes of opto-electronic light source 64 and opto-electronic light detector 66. The assembly shown in FIG. 10 thus includes lens mounting frame 30 as well as transmit bottom lens device 72 and receive bottom lens device 74 mounted over opto-electronic light source 64 and opto-electronic light detector 66, respectively.

Figure 11:
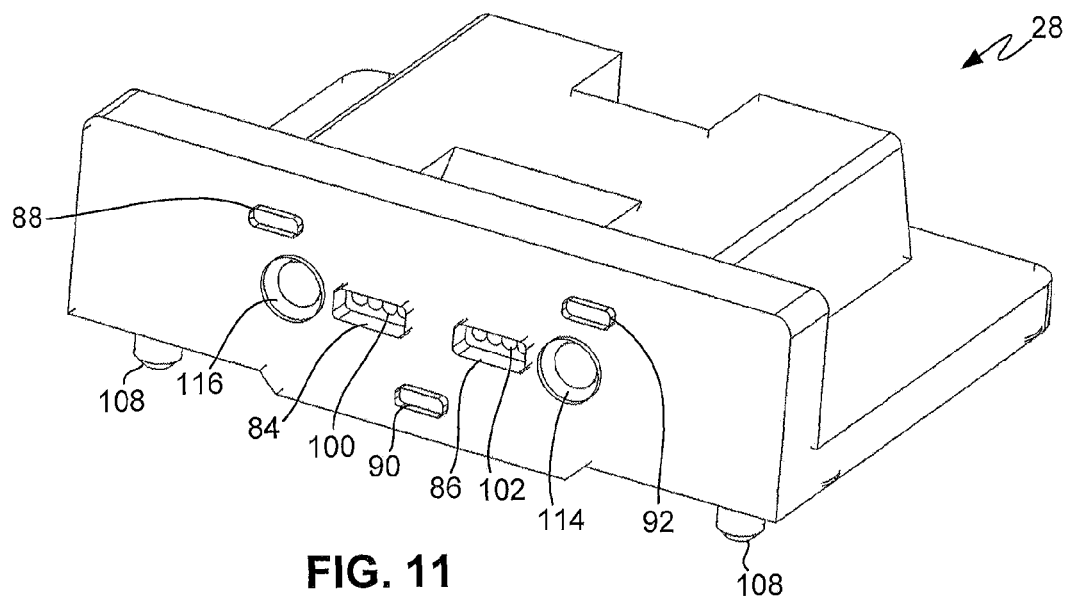
FIG. 11 is a top perspective view of the top lens device of the transceiver module.

As illustrated in FIG. 11, top lens device 28 has a transmit fiber port 84 and a receive fiber port 86. Note that in the assembly (FIG. 3) comprising electro-optical sub-assembly 22 and EMI shield 34 transmit fiber port 84 and receive fiber port 86 are aligned with EMI shield openings 54 and 56, respectively, to allow the optical signals to pass through. Alignment protrusions 88, 90 and 92 on the forward wall or face of top lens device 28 mate with openings 94, 96 and 98 (FIGS. 5-6), respectively, in EMI shield 34 to aid alignment. Transmit and receive fiber ports 84 and 86 include arrays of lenslets 100 and 102, respectively. In operation, lenslets 100 focus the transmit optical signals on the ends of fibers (not shown) of MPO connector 20 (FIGS. 1-2), and lenslets 102 substantially collimate the receive optical signals emitted from the ends of other fibers (not shown) of MPO connector 20. Although in the exemplary embodiment MPO connector 20 mates with optical communications module 10, in other embodiments (not shown) other types of devices can mate with such an optical communications module. For example, in an embodiment (not shown) in which the optical communications module is included in an active optical cable (AOC), the ends of the AOC fibers would be retained in bores in the fiber ports of a suitably configured top lens device.

Figure 12:
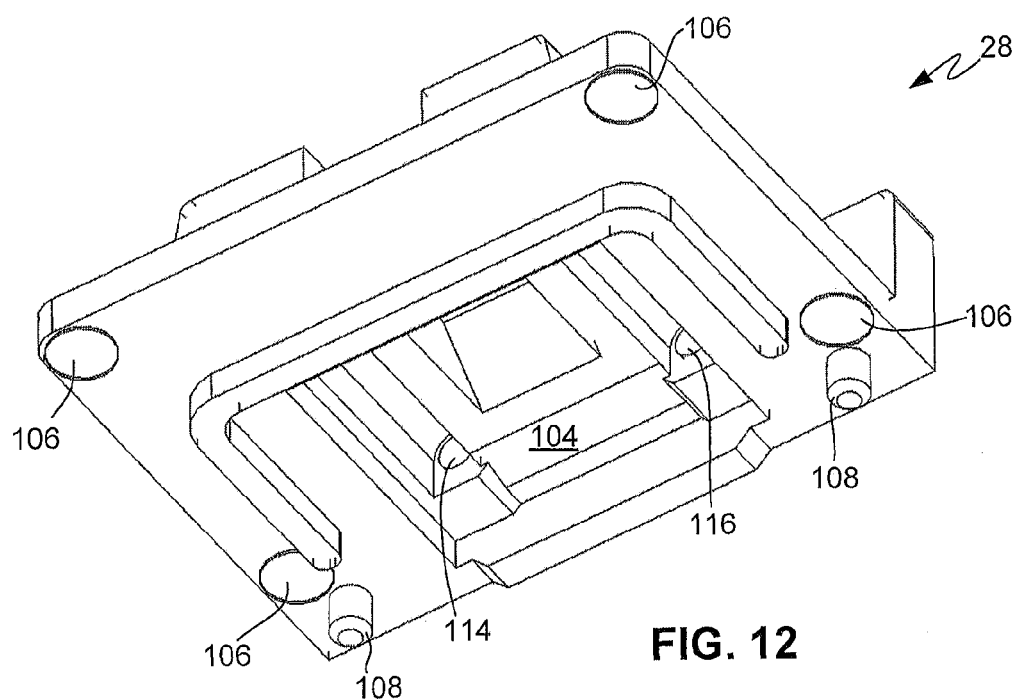
FIG. 12 is a bottom perspective view of the top lens device of the transceiver module.

In assembling optical communications module 10, top lens device 28 is mounted on the assembly described above with regard to FIG. 10. As illustrated in FIGS. 12 and 14, the lower or underside of top lens device 28 has a cavity 104. The lower surface of top lens device 28 includes four pads 106 that contact the upper surface of lens mounting frame 30 when top lens device 28 is mounted on lens mounting frame 30. The lower surface of top lens device 28 also includes two posts 108 that are received in two corresponding bores 110 (FIGS. 9-10) in the upper surface of lens mounting frame 30 when top lens device 28 is mounted on lens mounting frame 30. A reflective surface 112 (FIG. 14) formed in a wall of cavity 104 reflects the optical signals in the manner described below. Although EMI shield 34 is not shown in FIGS. 13-14 for purposes of clarity, in assembling optical communications module 10 EMI shield 34 is attached to the forward end of the assembly described above with regard to FIG. 10.

Figure 13:
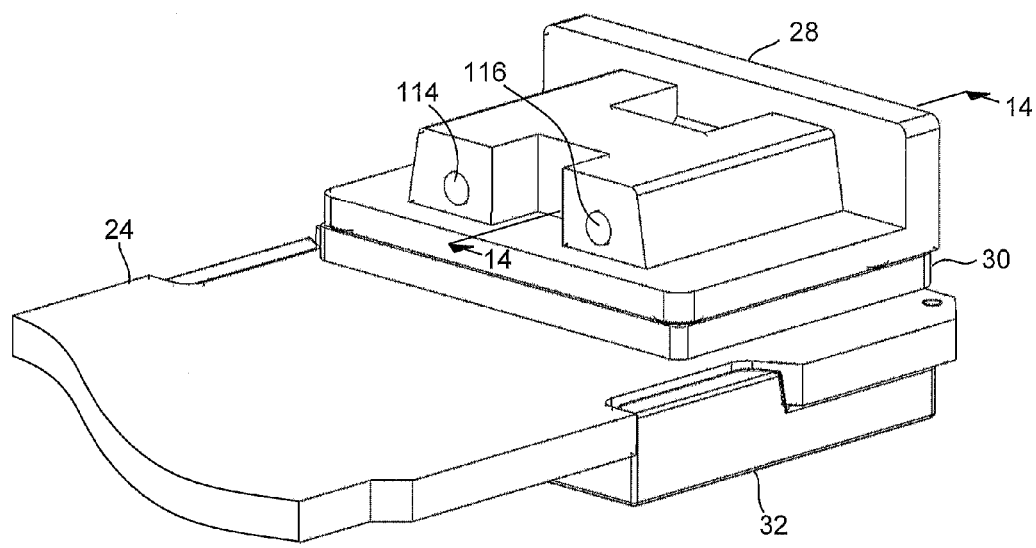
FIG. 13 is a perspective view showing the top lens device mounted on the assembly of FIG. 10.
Figure 14:
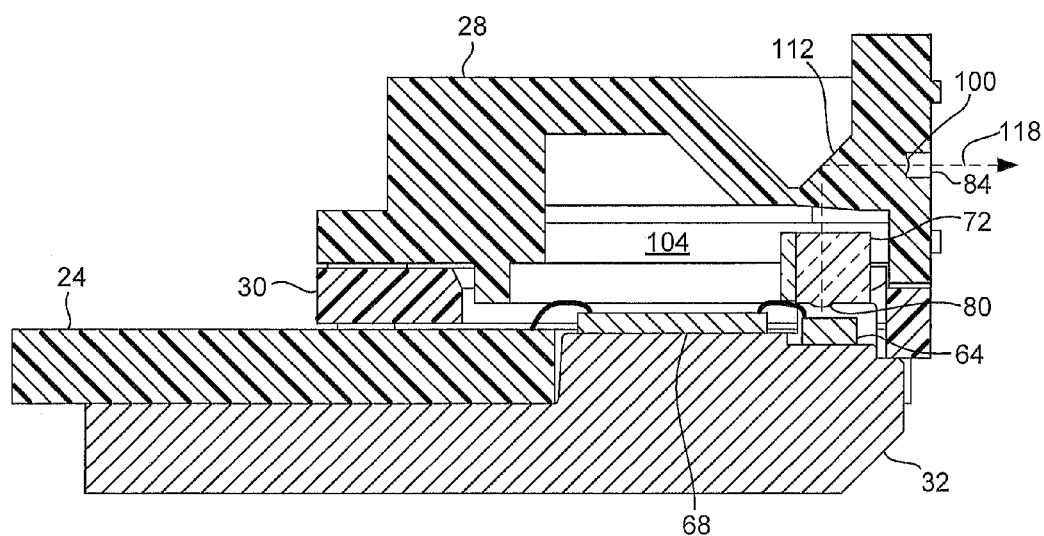
FIG. 14 is a sectional view taken on line 14-14 of FIG. 13.

With reference to FIGS. 11-13, note that top lens device 28 has two bores 114 and 116 extending between the forward and rearward ends of top lens device 28. In the assembled optical communications module 10 as described above, guide pins 42 and 44 extend through bores 114 and 116, respectively, as well as through openings 38 and 40 in EMI shield 34.

As illustrated in FIG. 14, in operation opto-electronic light source 64 emits the transmit optical signals (i.e., a light beam) in response to electrical signals it receives via electronic circuitry comprising driver chip 68 and circuit traces of PCB 24. That is, opto-electronic light source 64 converts the electrical signals into optical signals. This electronic circuitry is coupled to the electrical contact pads 26 at the rearward end of PCB 24 (FIG. 2), which thus can receive corresponding electronic signals from an external system (not shown) into which optical communications device 10 is plugged. Transmit bottom lens device 72 substantially collimates the transmit optical signals, which in turn impinge upon reflective surface 112. Reflective surface 112 redirects the transmit optical signals at an angle of substantially 90 degrees into transmit fiber port 84, from which the transmit optical signals are emitted. In FIG. 14, the transmit optical path 118 along which the transmit optical signals propagate in the above-described manner is indicated by a broken-line arrow.

Note that a space or air gap exists in cavity 104 between transmit bottom lens device 72 and the interior of top lens device 28. That is, transmit bottom lens device 72 extends into cavity 104 but does not contact any portion of top lens device 28. Although not shown in FIG. 14, receive bottom lens device 74 is similarly spaced apart from top lens device 28 by a gap.

Although not shown in FIG. 14, the receive optical signals entering receive fiber port 86 impinge upon reflective surface 112, which redirects the receive optical signals at an angle of substantially 90 degrees into receive bottom lens device 74. Receive bottom lens device 74 focuses the receive optical signals onto opto-electronic light detector 66. Although the receive optical path along which the receive optical signals propagate is not shown in FIG. 14, it can be noted that the receive optical path is similar to above-described transmit optical path 118. In response to the receive optical signals, opto-electronic light detector 66 produces electrical signals, which are provided to electronic circuitry comprising receiver chip 70 and circuit traces of PCB 24. That is, opto-electronic light detector 66 converts the receive optical signals into electrical signals. The plurality of electrical contact pads 26 can output corresponding electronic signals to an external system (not shown) into which optical communications device 10 is plugged.

Plugging MPO connector 20 into optical communications module 10 in preparation for the above-described operation can cause MPO connector 20 to exert mechanical forces upon top lens device 28. By spacing or separating top lens device 28 from bottom lens devices 72 and 74, mechanical forces acting upon top lens device 28 are not directly transferred to bottom lens devices 72 and 74 but rather are directly transferred to lens mounting frame 30 and then from lens mounting frame 30 to PCB 24. The module housing can retain PCB 24 in a manner that constrains movement of PCB 24 in a forward and rearward direction (i.e., in the direction in which optical communications module 10 is elongated) to a lesser extent than it constrains movement of PCB 24 in a lateral direction (i.e., a direction perpendicular to such a longitudinal direction). Indeed, the module housing can retain PCB 24 against essentially all movement (i.e., with tight tolerances) in the lateral direction but allow a small amount of movement or play (i.e., with wider tolerances) in the longitudinal direction. Allowing PCB 24 a small amount of movement or play in the longitudinal direction promotes the above-described transfer of mechanical forces from top lens device 28 to lens mounting frame 30 and thus to PCB 24, as the slight movement of PCB helps absorb such forces. Note that such longitudinal movement of PCB 24 is also relevant to the above-described feature by which EMI shield 34 is resiliently biased into contact with housing nose 16 to promote EMI shielding.

It should be noted that good alignment among elements in transmit optical path 118 depends to a greater extent upon good alignment between transmit bottom lens device 72 and opto-electronic light source 64 than it does upon good alignment between other elements in transmit optical path 118. Likewise, good alignment among elements in the receive optical path depends to a greater extent upon good alignment between receive bottom lens device 74 and opto-electronic light detector 66 than it does upon good alignment between other elements in the receive optical path. Thus, spacing or separating top lens device 28 from bottom lens devices 72 and 74 helps minimize adverse effects of mechanical forces upon top lens device 28 while not significantly sacrificing optical alignment.

One or more illustrative embodiments of the invention have been described above. However, it is to be understood that the invention is defined by the appended claims and is not limited to the specific embodiments described.

What is claimed is:

1. An optical communications module, comprising:
    a module housing having a forward end coupleable to a fiber-optic cable;
    a printed circuit board included in an electro-optical sub-assembly;
    an opto-electronic device mounted in fixed relation to a surface of the printed circuit board, the opto-electronic device having a plurality of opto-electronic elements with corresponding optical axes normal to the surface;
    a bottom lens device mounted over the opto-electronic device along an optical axis; and
    a top lens device, defining a cavity between the bottom lens device and an interior of top lens device, the bottom lens device extending into the cavity without contacting the top lens device, the top lens device having a fiber port configured to communicate optical signals with the fiber-optic cable and a device port configured to communicate the optical signals with the opto-electronic device through the bottom lens device, the top lens device having a reflector portion configured to redirect the optical signals at a non-zero angle between the fiber port and the device port.

2. The optical communications module of claim 1, further comprising an electromagnetic interference (EMI) shield interposed between the top lens device and the forward end of the module housing.

3. The optical communications module of claim 2, wherein the EMI shield has an opening aligned with the fiber port.

4. The optical communications module of claim 2, wherein the EMI shield has a resilient protrusion configured to bias the EMI shield toward the forward end of the module housing.

5. The optical communications module of claim 1, wherein: the electro-optical sub-assembly further includes a metal device mounting block coupled to the printed circuit board, and a surface of the device mounting block is substantially parallel to a surface of the printed circuit board; and the opto-electronic device is die-attached to the surface of the metal device mounting block.

6. The optical communications module of claim 5, wherein the printed circuit board has an elongated shape with a forward end having a notch, and the surface of the device mounting block with the opto-electronic device die-attached thereto extends into the notch.

7. The optical communications module of claim 5, wherein the bottom lens device is mounted on the device mounting block over the opto-electronic device.

8. The optical communications module of claim 1, wherein:
    the opto-electronic device comprises a light source device having a plurality of laser elements and a light detector device having a plurality of photodiode elements; and
    the bottom lens device comprises a transmit bottom lens device mounted over the light source device and having a plurality of transmit lenslets, each transmit lenslet aligned with a corresponding optical axis of a laser element; and
    a receive bottom lens device mounted over the light detector device and having a plurality of receive lenslets, each receive lenslet aligned with a corresponding optical axis of a photodiode element.

9. The optical communications module of claim 8, wherein:
    the electro-optical sub-assembly further includes a metal device mounting block;
    the light source device and light detector device are die-attached to the surface of the metal device mounting block; and
    the transmit bottom lens device and receive bottom lens device are mounted on the metal device mounting block.

10. The optical communications module of claim 1, further comprising a lens mounting frame having a substantially planar shape mounted on the surface of the printed circuit board, wherein a lower surface of the top lens device is mounted on an upper surface of the lens mounting frame.

11. The optical communications module of claim 10, wherein the top lens device consists of optically transparent plastic material.

12. The optical communications module of claim 11, wherein the lens mounting frame consists of optically opaque plastic material, and the top lens device and lens mounting frame are attached to each other by a laser weld.

13. The optical communications module of claim 11, further comprising a plurality of guide pins extending through a corresponding plurality of bores in the top lens device.

14. The optical communications module of claim 13, further comprising an electromagnetic interference (EMI) shield between the top lens device and the forward end of the module housing, the EMI shield has an opening aligned with the fiber port, and the plurality of guide pins extend from the top lens through the EMI shield.

15. The optical communications module of claim 14, further comprising a retaining plate abutting the top lens device and retaining ends of the guide pins, wherein the top lens device is sandwiched between the retaining plate and the EMI shield.

16. The optical communications module of claim 10, wherein:
- the lens mounting frame has a continuous perimeter surrounding an open interior region;
- the lower surface of the top lens device is in contact with the upper surface of the lens mounting frame all along the perimeter of the lens mounting frame;
- the electro-optical sub-assembly further includes a metal device mounting block, the perimeter of the lens mounting frame surrounding a surface of the device mounting block; and
- the opto-electronic device is mounted on the surface of the device mounting block.

17. An optical communications module, comprising:
- a module housing having a forward end coupleable to a fiber-optic cable;
- a printed circuit board included in an electro-optical sub-assembly;
- an opto-electronic device mounted in fixed relation to a surface of the printed circuit board, the opto-electronic device having a plurality of opto-electronic elements with corresponding optical axes normal to the surface;
- a bottom lens device mounted over the opto-electronic device along an optical axis;
- a top lens device spaced apart from the bottom lens device by a gap, the top lens device having a fiber port configured to communicate optical signals with the fiber-optic cable and a device port configured to communicate the optical signals with the opto-electronic device through the bottom lens device, the top lens device having a reflector portion configured to redirect the optical signals at a non-zero angle between the fiber port and the device port;
- an electromagnetic interference (EMI) shield interposed between the top lens device and the forward end of the module housing; and
- a plurality of guide pins extending from the top lens through the EMI shield and making electrical contact with the EMI shield.

18. The optical communications module of claim 17, wherein the EMI shield has a plurality of openings, a wall of each opening having a deformable protrusion making electrical contact with the guide pin.

19. An optical communications module, comprising:
- a module housing having a forward end coupleable to a fiber-optic cable;
- an electro-optical sub-assembly including a printed circuit board;
- an opto-electronic device mounted on a surface of the electro-optical sub-assembly, the opto-electronic device having a plurality of opto-electronic elements with corresponding optical axes normal to the surface;
- a bottom lens device mounted over the opto-electronic device along an optical axis; and
- a top lens device coupled to the electro-optical sub-assembly but not in contact with the bottom lens device, the top lens device having a fiber port for communicating optical signals with the fiber-optic cable and a device port for communicating the optical signals with the opto-electronic device through the bottom lens, the top lens device having a reflector portion for redirecting the optical signals at an angle of substantially 90 degrees between the fiber port and the device port;
- a lens mounting frame having a substantially planar shape mounted on the surface of the printed circuit board, wherein a lower surface of the top lens device is mounted on an upper surface of the lens mounting frame;
- an electromagnetic interference (EMI) shield interposed between the top lens device and the forward end of the module housing; and
- a plurality of guide pins extending from the top lens through the EMI shield and making electrical contact with the EMI shield.

* * * * *